United States Patent Office 2,723,264
Patented Nov. 8, 1955

2,723,264

2,4-BIS(METHYLSULFONYL)-BENZENEAZO-N-HY-DROXY - ALKYL - N - CARBOALKOXYALKYL-ANILINE COMPOUNDS

Joseph B. Dickey and George J. Taylor, Kingsport, Tenn., assignors to Eastman Kodak Company, Rochester, N. Y., a corporation of New Jersey No Drawing. Application June 30, 1951,
Serial No. 234,683

9 Claims. (Cl. 260—207)

This invention relates to new azo compounds and their application to the art of dyeing or coloring.

We have discovered that the azo compounds having the general formula:

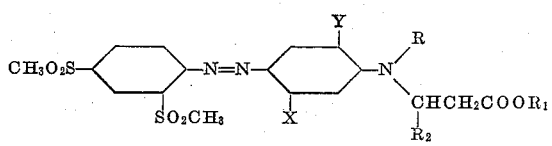

wherein R represents a hydroxyalkyl group having 2 to 3 carbon atoms, $R_1$ represents a methyl group, an ethyl group or a $\beta$-hydroxyethyl group, $R_2$ represents a hydrogen atom or a methyl group, X represents a hydrogen atom, a chlorine atom, a bromine atom or a methyl group and Y represents a hydrogen atom and wherein Y also represents a methoxy group, an ethoxy group or a $\beta$-hydroxyethoxy group when X is a chlorine atom or a bromine atom are valuable dyes for coloring textile materials made of or containing a cellulose alkyl carboxylic acid ester having 2 to 4 carbon atoms in the acid groups thereof. They are particularly of use for the coloration of cellulose acetate textile materials. They color the aforesaid textile materials orange to red shades which have excellent fastness to light and gas.

It is an object of our invention to provide new azo compounds. Another object is to provide a satisfactory process for the preparation of the new azo compounds of the invention. A further object is to provide dyed cellulose alkyl carboxylic acid ester textile materials which possess excellent fastness to light and gas. A particular object is to provide new azo compounds which are especially of value for the dyeing of cellulose acetate textile materials.

By cellulose alkyl carboxylic acid esters having two to four carbon atoms in the acid groups thereof, we mean to include, for example, both hydrolyzed and unhydrolyzed cellulose acetate, cellulose propionate, cellulose butyrate, cellulose acetate-propionate and cellulose acetate-butyrate.

The new azo compounds of our invention are prepared by diazotizing 2,4-bis(methylsulfonyl)-aniline and coupling the diazonium compound obtained with a compound having the formula:

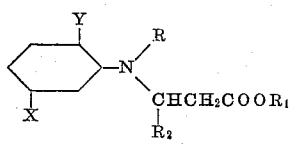

R, $R_1$, $R_2$, X and Y in the foregoing formula have the meaning previously assigned to them.

For the sake of clarity it is here noted that by the expression "a hydroxyalkyl group having 2 to 3 carbon atoms" is meant the $\beta$-hydroxyalkyl group, the $\beta$-hydroxypropyl group, the $\gamma$-hydroxypropyl group and the $\beta,\gamma$-dihydroxypropyl group.

The following examples illustrate the azo compounds of our invention and their manner of preparation.

EXAMPLE 1

A. Nitrosyl sulfuric acid 7.6 grams of dry sodium nitrite were added, with stirring, to 92 grams of sulfuric acid (sp. gr. 1.84) while keeping the temperature below 70° C. The resulting solution was then cooled to 5° C.–10° C. and 100 grams of acetic acid were added dropwise, with stirring, while maintaining the temperature at 5° C.–10° C.

B. Diazotization 24.9 grams of 2,4-bis(methylsulfonyl)-aniline were added slowly, with stirring, to the nitrosyl sulfuric acid prepared as described above while keeping the temperature below 20° C. Then, 100 grams of acetic acid were added dropwise, with stirring, at a temperature between 15° C.–20° C. and stirring was continued until all the 2,4-bis(methylsulfonyl)-aniline had dissolved and diazotization was complete. The diazonium solution thus formed was then poured onto 500 grams of crushed ice and enough urea was added to destroy the excess nitrous acid. The diazonium solution should be clear and free of suspended undiazotized amine.

C. Coupling 21.3 grams of N-$\beta$-hydroxyethyl-N-$\beta$-carbomethoxyethylaniline were dissolved in a mixture of 200 cc. of water containing 15 cc. of hydrochloric acid (sp. gr. 1.16) and 200 grams of ice were added. To this well cooled mixture the diazonium solution prepared as described in B was then added slowly, with stirring. The coupling reaction which takes place was completed by adding, portionwise, sufficient sodium carbonate to neutralize the acid present in the reaction mixture. The dye compound formed was recovered by filtration, washed well with water and dried. It has the formula:

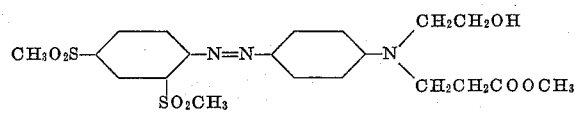

and colors cellulose acetate textile materials orange shades.

EXAMPLE 2

24.9 grams of 2,4-bis(methylsulfonyl)-aniline were diazotized and the diazonium compound obtained was coupled with 22.7 grams of N-$\beta$-hydroxyethyl-N-$\alpha$-methyl-$\beta$-carbomethoxyethylaniline. Diazotization, coupling and recovery of the dye compound formed were carried out in accordance with the procedure described in Example 1. The dye compound obtained colors cellulose acetate textile materials orange shades.

EXAMPLE 3

24.9 grams of 2,4-bis(methylsulfonyl)-aniline were diazotized and the diazonium compound obtained was coupled with 24.8 grams of N-$\beta$-hydroxyethyl-N-$\beta$-carbomethoxyethyl-m-chloroaniline. Diazotization, coupling and recovery of the dye compound formed were carried out in accordance with the procedures described in Example 1. The dye compound obtained colors cellulose acetate textile materials scarlet shades.

EXAMPLE 4

24.9 grams of 2,4-bis(methylsulfonyl)-aniline were diazotized and the diazonium compound obtained was coupled with 27.7 grams of N-$\beta$-hydroxyethyl-N-$\beta$-carbomethoxyethyl-2-methoxy-5-chloroaniline. Diazotization, coupling and recovery of the dye compound formed were carried out in accordance with the procedure described in Example 1. The dye compound obtained colors cellulose acetate textile materials rubine shades.

EXAMPLE 5

24.9 grams of 2,4-bis(methylsulfonyl)-aniline were diazotized and the diazonium compound obtained was coupled with 22.7 grams of N-β-hydroxyethyl-N-β-carboethoxyethylaniline. Diazotization, coupling and recovery of the dye compound formed were carried out in accordance with the procedure described in Example 1. The dye compound obtained colors cellulose acetate textile materials orange shades.

EXAMPLE 6

24.9 grams of 2,4-bis(methylsulfonyl)-aniline were diazotized and the diazonium compound obtained was coupled with 24.3 grams of N-β,γ-dihydroxypropyl-N-β-carbomethoxyethylaniline. Diazotization, coupling and recovery of the dye compound formed were carried out in accordance with the procedure described in Example 1. The dye compound obtained colors cellulose acetate textile materials orange shades.

EXAMPLE 7

24.9 grams of 2,4-bis(methylsulfonyl)-aniline were diazotized and the diazonium compound obtained was coupled with 22.7 grams of N-β-hydroxypropyl-N-β-carbomethoxyethylaniline. Diazotization, coupling and recovery of the dye compounds formed were carried out in accordance with the procedure described in Example 1. The dye compound obtained colors cellulose acetate textile materials orange shades.

EXAMPLE 8

24.9 grams of 2,4-bis(methylsulfonyl)-aniline were diazotized and the diazonium compound obtained was coupled with 22.7 grams of N-γ-hydroxypropyl-N-β-carbomethoxyethylaniline. Diazotization, coupling and recovery of the dye compound formed were carried out in accordance with the procedure described in Example 1. The dye compound obtained colors cellulose acetate textile materials orange shades.

EXAMPLE 9

24.9 grams of 2,4-bis(methylsulfonyl)-aniline were diazotized and the diazonium compound obtained was coupled with 24.3 grams of N-CH$_2$CH$_2$COOCH$_2$CH$_2$OH-N-β-hydroxyethylaniline. Diazotization, coupling and recovery of the dye compound formed were carried out in accordance with the procedure described in Example 1. The dye compound obtained colors cellulose acetate textile materials orange shades.

EXAMPLE 10

24.9 grams of 2,4-bis(methylsulfonyl)-aniline were diazotized and the diazonium compound obtained was coupled with 30.7 grams of N-β-hydroxyethyl-N-β-carbomethoxyethyl - 2 - β - hydroxyethoxy - 5 - chloroaniline. Diazotization, coupling and recovery of the dye compound formed were carried out in accordance with the procedure described in Example 1. The dye compound obtained colors cellulose acetate textile materials rubine shades.

EXAMPLE 11

24.9 grams of 2,4-bis(methylsulfonyl)-aniline were diazotized and the diazonium compound obtained was coupled with 22.7 grams of N-β-hydroxyethyl-N-β-carbomethoxyethyl-m-toluidine. Diazotization, coupling and recovery of the dye compound formed were carried out in accordance with the procedure described in Example 1. The dye compound obtained colors cellulose acetate textile materials reddish-orange shades.

Other coupling compounds that are used in the preparation of the azo compounds of our invention, together with the shades yielded by the dyes obtained, include, for example, N-β,γ-dihydroxypropyl-N-β-carboethoxyethylanilin (orange), N-β-hydroxypropyl - N - β - carboethoxyaniline (orange), N-β,γ-dihydroxypropyl-N-β-carbomethoxyethyl-m-chloroaniline (scarlet), N-β,γ-dihydroxypropyl- N-β-carbomethoxyethyl-2-methoxy-5-chloroaniline (rubine), N-γ-hydroxypropyl-N-β-carbomethoxyethyl-2-methoxy-5-chloroaniline (rubine), N-β,γ-dihydroxypropyl-N-β-carbomethoxyethyl-m-toluidine (reddish-orange), N-γ-hydroxypropyl-N-β-carbomethoxyethyl-m-toluidine (reddish-orange) and N-β-hydroxyethyl-N-β-carbomethoxyethyl-m-bromoaniline (scarlet).

The new azo dye compounds of our invention may be advantageously directly applied to the material undergoing coloration in the form of an aqueous suspension which can be prepared by grinding the dye to a paste in the presence of a sulfonated oil, soap, sodium lignin sulfonate, or other suitable dispersing agent and dispersing the resulting paste in water.

Direct dyeing operations can, with advantage, be conducted at temperatures of about 70° C.–90° C. but any suitable temperature can be used. Thus, the textile material such as cellulose acetate, for example, to be dyed or colored is ordinarily added to the dye bath at a temperature lower than that at which the main portion of the dyeing is to be effected, a temperature approximating 45° C.–55° C., for example, following which the temperature is raised to that selected for carrying out the dyeing operation. The temperature at which the dyeing is conducted may, of course, be varied somewhat depending upon the particular material undergoing coloration. As is understood by those skilled in the dyeing art, the intensity of dyeing can be varied by varying the proportion of dye to material undergoing coloration. The amount of dye used can be, for example, ⅛% to 3% (by weight) of that of the textile material, although lesser or greater amounts of dye can be used.

We claim:

1. The azo compounds having the general formula:

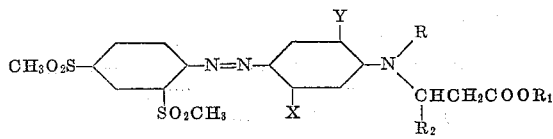

wherein R represents a hydroxyalkyl group having 2 to 3 carbon atoms, R$_1$ represents a member selected from the group consisting of a methyl group, an ethyl group and a β-hydroxyethyl group, R$_2$ represents a member selected from the group consisting of a hydrogen atom and a methyl group, X represents a member selected from the group consisting of a hydrogen atom, a chlorine atom, a bromine atom and a methyl group and Y represents a hydrogen atom and wherein Y also represents a member selected from the group consisting of a methoxy group, an ethoxy group and a β-hydroxyethoxy group when X is a chlorine atom or a bromine atom.

2. The azo compounds having the general formula:

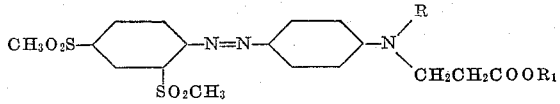

wherein R represents a hydroxyalkyl group having 2 to 3 carbon atoms and R$_1$ represents an alkyl group having 1 to 2 carbon atoms.

3. The azo compounds having the general formula:

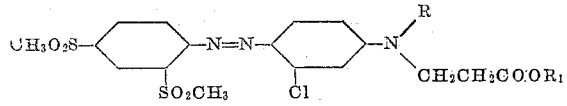

wherein R represents a hydroxyalkyl group having 2 to 3 carbon atoms and R$_1$ represents an alkyl group having 1 to 2 carbon atoms.

4. The azo compounds having the general formula:

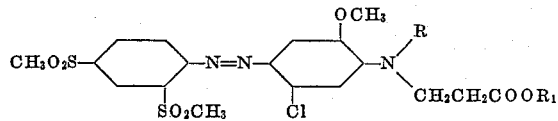

wherein R represents a hydroxyalkyl group having 2 to 3 carbon atoms and $R_1$ represents an alkyl group having 1 to 2 carbon atoms.

5. The azo compound having the formula:

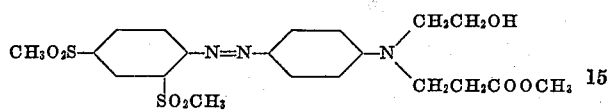

6. The azo compound having the formula:

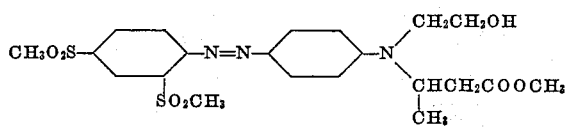

7. The azo compound having the formula:

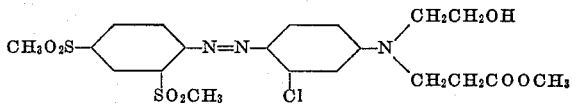

8. The azo compound having the formula:

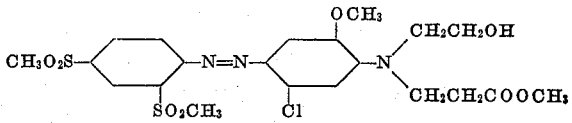

9. The azo compound having the formula:

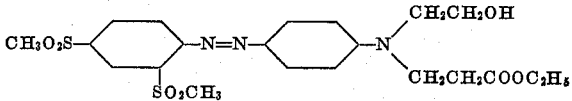

References Cited in the file of this patent
UNITED STATES PATENTS

| | | |
|---|---|---|
| 2,147,338 | Felix et al. | Feb. 14, 1939 |
| 2,470,094 | Dickey et al. | May 17, 1949 |